Dec. 10, 1946.   R. M. MASLIN   2,412,525
CUTTING TOOL
Filed May 4, 1943

INVENTOR
Robert M. Maslin
BY
W. M. Wilson
ATTORNEY

Patented Dec. 10, 1946

2,412,525

UNITED STATES PATENT OFFICE 2,412,525

CUTTING TOOL

Robert M. Maslin, Sayre, Pa., assignor to International Business Machines Corporation, New York, N. Y., a corporation of New York Application May 4, 1943, Serial No. 485,589

5 Claims. (Cl. 29—105)

This invention relates to improvements in cutting tools and more specifically to an improved slot milling cutter. Although shown in connection with slot cutting, it is to be understood that the advantages are not so limited but apply as well to cutters applied to outer side surfaces.

In the cutting of slots by a milling machine, it is quite customary to use an end miller and run down one side of the slot, cutting along the side wall, and then return to cut the other side wall. If such operations are to be carefully measured for width of slot, they consume quite an amount of time and furthermore it is found difficult to hold the width of the slot to close tolerances. Although fly cutters are sometimes used for the purpose of finish milling, the ordinary form of fly cutter cannot be adjusted to attain a desired particular width of slot. With the cutter of the present invention, slot widths held within limits of .0002 of an inch have been successfully produced.

An object of the invention is to provide a finishing slot milling cutter with an angularly adjustable tool.

Another object of the invention is to provide a cutting tool holder wherein the cutting member is caught between two adjusting screws passing through the holder and cooperating with the cutting member to vary its angular position relative to the holder.

An object of the invention is to furnish a fly cutter with a removable tool bit held in an opening which confines the bit from movement longitudinal with the line of cutting, but said opening is wider than the bit to permit lateral adjustment by set screws.

Another feature of the invention is the provision of a tool bit of rectangular cross section adjustably held by three set screws, the one set screw clamping as a pivot against the side of the bit, and the other two screws mounted at right angles to said pivot screw and cooperating with opposite sides of the bit at equal distances in different directions from a line running through the center of said pivot screw. The radial hole in which the bit is mounted is of rectangular cross section and wider than the bit in the direction of adjustment, i. e., wider in a direction along the axis of rotation of the tool holder in which the hole is formed.

Another object of the invention is the provision of a cylindrical tool holder, said holder having a pair of radial openings in which is assembled two cutting members, said members having cutting faces offset with respect to each other to cut the opposite walls of a slot, said cutting members being adjustable to widen or narrow the slot by means of pairs of adjustment screws cooperating with the opposite sides of each cutting member at spaced intervals.

Other objects of the invention will be pointed out in the following description and claims and illustrated in the accompanying drawing, which discloses, by way of example, the principle of the invention and the best mode, which has been contemplated, of applying that principle.

Figure 1:
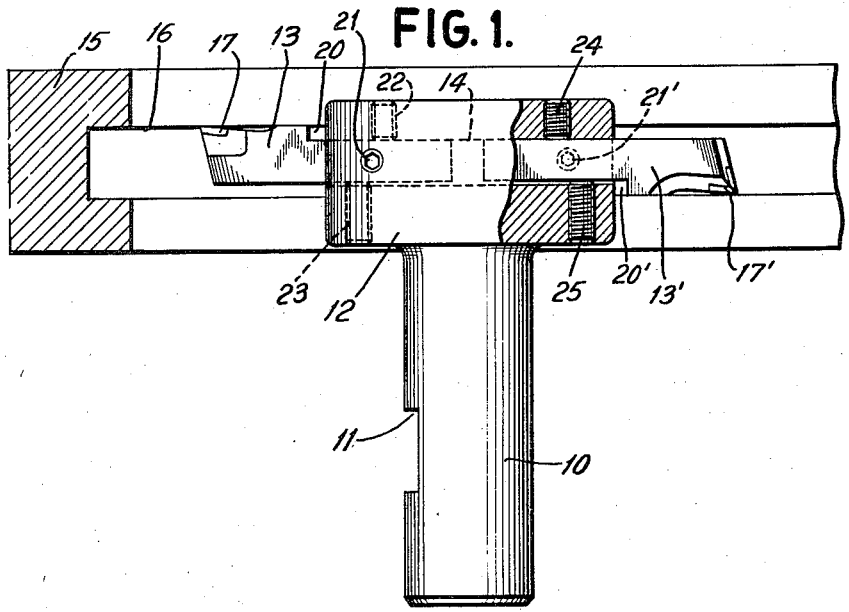
Fig. 1 is a plan view of the milling cutter of the present invention. A piece of finished slotted work is shown under the cutter.

In Fig. 1 it is seen that the frame of the tool holder has a cylindrical end 10 formed with a flat portion 11 which is to be clamped into the head stock of a lathe or the rotating head of a milling machine. Extending from the clamping end 10 is an enlarged circular head 12 for holding a pair of cutting members or tool bits 13 and 13'. The bits project from side openings in head 12, said openings being part of a single rectangular hole 14 extending through said head and centralized with respect to the axis of the holder, so that the openings are radial to the operating center of the holder.

Figure 2:
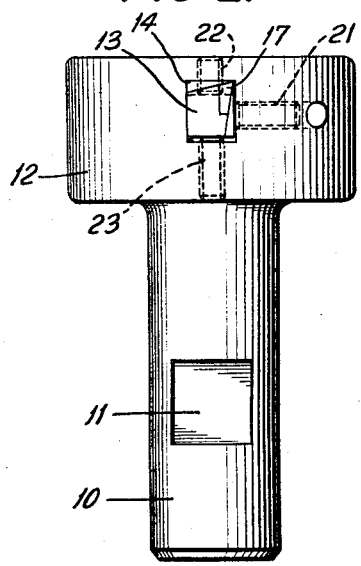
Fig. 2 is a side elevation view of the cutter.

Hole 14 is formed in the head 12 by first milling an open slot across the top of the head as viewed in Fig. 2. A brass bar is then placed temporarily across the bottom of the slot while a cover is welded over the top of the hole. After the cover is completed, the brass bar is removed and the head is turned down to a clean finish.

As seen in Fig. 2, the rectangular hole 14 is so proportioned with respect to the rectangular cross section of the bit 13 that the tool bit is closely confined by the side walls and held from moving circumferentially, i. e. longitudinally along the direction of cutting. However, in the other direction, i. e. up and down and laterally with respect to the work, the top and bottom of the rectangular hole 14 is not close to the bit and, therefore, it is free to be adjusted to angles other than 90° with respect to the holder axis.

In Fig. 1 a piece of work 15 is shown below the cutting tool. The work is shown to have a slot 16 which is the formation that is to be held to close limits, especially with regard to the width of the slot. As the tool rotates counterclockwise (Fig. 3) (down on the right in Fig. 1), a finishing cut is taken off the side walls of slot 16 as the work is moved at right angles to the axis of rotation of the tool. Tool bit 13 is provided with a Carboloy tip 17 brazed in place and facing (Fig. 1) so as to cut along the far side of slot 16. Similarly, tool bit 13' has a Carboloy tip 17' facing downward and pointed to cut along the near side of slot 16.

It is obvious that the two tool bits could be spaced and arranged to cut on outer surfaces of the work piece 15. Then, the same minute variation of cutting control as about to be explained with reference to inner surface removal would also apply to determination of outside measurements, such as the width of long ribs on a base.

It is apparent that, while taking the finishing cut in slot 16, the slot can be made wider (Fig. 1) by raising the end of bit 13 and lowering the end of bit 13'. In a like manner for a narrower slot, the end of bit 13 is to be lowered and the end of bit 13' raised. The bit adjustments are to be made singly or in combination. The purpose of the present device is to provide means for changing the angularity of the bits to a fine degree and then hold them in a positive way in the adjusted position.

The inner ends of bits 13 and 13' (Fig. 1) are cut with shoulders 20 and 20' to fit loosely in hole 14. Cooperating with the bits are clamping set screws 21 and 21' threaded in head 12 and used to hold the bits in place by forcing them against the side wall of the confining sides of hole 14.

Figure 3:
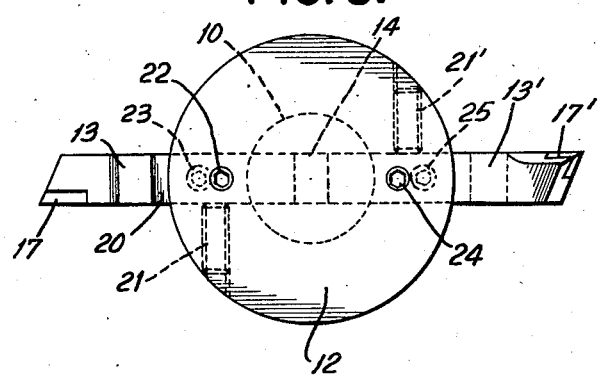
Fig. 3 is an end view of the tool holder.

Other set screws are threaded in head 12 at right angles to the axis of set screws 21. There is a pair of set screws 22 and 23 cooperating with bit 13 and another pair of screws 24 and 25 cooperating with bit 13'. These screws are used for adjustment of the bits and they control the variation of the angles at which the cutting members project out of the holder. In Fig. 1 it is seen that the inner ends of set screws 24 and 25 project into the hole 14 and there engage opposite sides of the bit 13'. As already explained, the bit 13' is not confined closely by the upper and lower walls of the rectangular hole or opening 14, but it is free for a range of angular adjustment. The two set screws 24 and 25 are not aligned axially but are offset with respect to each other as seen in Figs. 1 and 3. They are about equally spaced from the center of the clamping screw 21', so that even if the clamp is engaged it is possible to rock the bit with the end of screw 21' as a center, as either adjustment screw is tightened. However, an adjustment is usually made with the upper side of bit 13' (Fig. 1) contacting the upper wall of hole 14, and the angle that the bit makes with respect to said upper wall varied by tightening screw 24 while loosening screw 25 or vice versa.

Assuming that the width of cut is narrowed by loosening screw 25 and tightening screw 24, it is apparent that minute changes and enlargements in width are made by loosening screw 24 and tightening screw 25. The other pair of set screws 22 and 23 have the same kind of adjustment and holding control over the position of tool bit 13. Since a relatively coarse movement of the adjustment set screws is productive of a slight movement of the cutting edge on the outer end of the cutting members, it is possible to adjust the device to cut within close limits. It has been found that variations as minute as ten-thousandths of an inch are possible with this form of control.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A cutting tool comprising a frame, a cutting member assembled on said frame, a pair of adjustment screws assembled in said frame and abutting against said member on opposite sides and at different places along the length of said member, and a third screw in said frame and abutting against said member at right angles to the plane in which lie the other two screws but out of alignment with said other two screws, said third screw serving for holding said member on said frame in an adjusted position and to act as a pivot around which adjustment takes place.

2. In a rotary cutter, a cylindrical frame having a radial opening of rectangular cross section, a cutting member of rectangular cross section fitting closely in said opening in the direction of a plane at right angles to the axis of the frame but loosely assembled within said opening in the plane of the axis, a pair of set screws threaded in said frame perpendicular to a pair of side walls of said rectangular opening and abutting against said member at different distances from the cutting edge of said member and a third screw threaded in said frame at right angles to the other two screws and abutting the member midway between them for holding said member in adjusted position, said third screw being out of alignment with said other two screws.

3. A rotary cutter comprising a frame with a cylindrical clamping end and an enlarged head having a pair of radial openings, a pair of cutting members assembled in said openings and free to be adjusted angularly therein, a pair of set screws threaded parallel to the axis of said head, into the flat sides of said head and cooperating with each said members, one of said screws abutting against one side of the member and the other against the other side of the member at different points along the length of said members, said members having cutting edges facing in opposite directions, and means for holding said cutting members in adjusted position on said frame, whereby cuts of variable widths may be taken.

4. A fly cutter comprising a tool holder having a cylindrical clamping end and an enlarged cylindrical head formed with a pair of radial rectangular openings running through the center of said head, a pair of cutting members assembled loosely in said rectangular openings, one of which has a cutting face with edges on the near side and the other of which has cutting faces with edges on the far side, both of said cutting faces facing in the same rotative direction, means for holding said members in said head, pairs of set screws, one pair for each member and threaded through said head on opposite sides of each radial opening and at right angles to the cutting plane of the members, said set screws abutting against opposite sides of said member and at different distances from the center of said cylindrical portion of said frame, whereby each of said tool members is adjustable angularly with respect to the walls of said head to vary the size of the area cut.

5. A tool holder with a tool bit opening, a tool bit mounted thereon and held in place in said opening by three screws, one of said screws clamping said bit against the holder, the other two of said screws mounted in said holder at right angles to the clamping screw and engaging opposite sides of the bit at equal distances along the sides of the bit and in different directions from the center of said clamping screw.

ROBERT M. MASLIN.